United States Patent
Vu et al.

(10) Patent No.: US 11,886,898 B2
(45) Date of Patent: Jan. 30, 2024

(54) GPU-REMOTING LATENCY AWARE VIRTUAL MACHINE MIGRATION

(71) Applicant: VMware, Inc., Palo Alto, CA (US)

(72) Inventors: Lan Vu, Palo Alto, CA (US); Uday Pundalik Kurkure, Los Altos Hills, CA (US); Hari Sivaraman, Livermore, CA (US)

(73) Assignee: VMware, Inc., Palo Alto, CA (US)

( * ) Notice: Subject to any disclaimer, the term of this patent is extended or adjusted under 35 U.S.C. 154(b) by 305 days.

(21) Appl. No.: 16/833,833

(22) Filed: Mar. 30, 2020

(65) Prior Publication Data

US 2021/0303327 A1 Sep. 30, 2021

(51) Int. Cl.
*G06F 9/455* (2018.01)
*G06T 1/20* (2006.01)

(52) U.S. Cl.
CPC ............ *G06F 9/45558* (2013.01); *G06T 1/20* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2012/0084774 A1* | 4/2012 | Post | G06F 9/5088 718/1 |
| 2014/0359614 A1* | 12/2014 | Spracklen | G06F 9/45558 718/1 |
| 2017/0132746 A1* | 5/2017 | Wilt | G06F 9/5077 |
| 2020/0142753 A1* | 5/2020 | Harwood | G06F 9/52 |

* cited by examiner

*Primary Examiner* — Lewis A Bullock, Jr.
*Assistant Examiner* — Melissa A Headly
(74) *Attorney, Agent, or Firm* — King Intellectual Asset Management

(57) ABSTRACT

Various aspects are disclosed for graphics processing unit (GPU)-remoting latency aware migration. In some aspects, a host executes a GPU-remoting client that includes a GPU workload. GPU-remoting latencies are identified for hosts of a cluster. A destination host is identified based on having a lower GPU-remoting latency than the host currently executing the GPU-remoting client. The GPU-remoting client is migrated from its current host to the destination host.

20 Claims, 4 Drawing Sheets

GPU-REMOTING LATENCY AWARE VIRTUAL MACHINE MIGRATION

BACKGROUND

A resource scheduler is an important component of a datacenter management system. Resource schedulers can move workloads among hosts in a datacenter. This can maintain overall datacenter or cluster load balance, and can improve or maximize performance of the various workloads in the datacenter.

Machine learning workloads, deep learning workloads, and other high-performance workloads have been increasingly used for enterprise applications. Graphics Processing Units (GPUs) can accelerate computation time for these enterprise applications. Developments in GPU architecture and access have allowed GPUs to be virtualized and shared across multiple workloads. These developments allow GPUs to be utilized to more quickly perform popular high performance workloads including machine learning workloads, deep learning workloads, and graphics processing workloads. As a result, GPUs are being increasingly deployed and utilized in datacenters. However, resource schedulers can fail to sufficiently consider GPUs and GPU-based workloads for placement, load balancing, and other migration decisions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to graphics processing unit (GPU)-remoting latency aware virtual machine migration. Machine learning workloads, deep learning workloads, and other high-performance workloads have been increasingly used for enterprise applications. GPUs can accelerate computation time for these enterprise applications. Developments in GPU architecture and access have allowed GPUs to be virtualized and shared across multiple workloads. Some resource schedulers fail to sufficiently consider GPUs and GPU-based workloads for load balancing and other migration decisions. However, the present disclosure describes mechanisms that enable GPU-remoting latency aware virtual machine migration. This provides a solution that allows resource schedulers to maintain performance of GPU-based workloads on hosts that include remoting-enabled GPUs.

Figure 1:
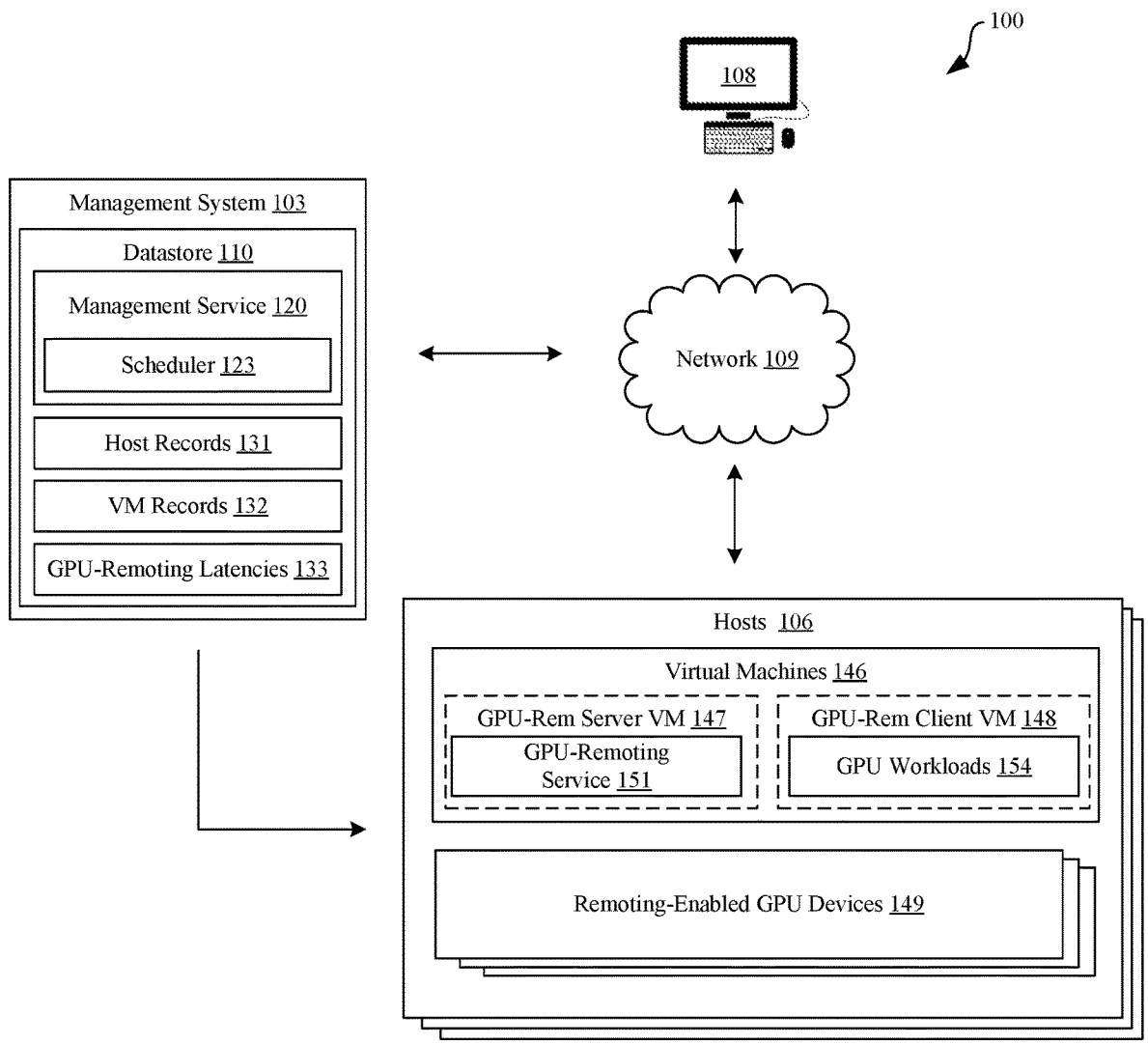
FIG. 1 is a drawing of an example of a networked computing environment that includes a management system, a client device, and hosts.

Turning to FIG. 1, an example of a networked environment 100 is shown. The networked environment 100 can include a management system 103, client device(s) 108, and hosts 106 in communication with one other over a network 109. The network 109 can include, for example, the Internet, intranets, extranets, wide area networks (WANs), local area networks (LANs), wired networks, wireless networks, other suitable networks, or any combination of two or more such networks.

The networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

The management system 103 can include a server computer or any other system providing computing capability. The management system 103 can provide access to functions for each of a number of different enterprises. The management system 103 can include a plurality of computing devices that are arranged in one or more server banks, computer banks, or other arrangements. The management system 103 can include a grid computing resource or any other distributed computing arrangement. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 120 as well as other applications, services, processes, systems, engines, or functionality not discussed in detail herein. The management service 120 can be stored in the datastore 110 of the management system 103.

In various embodiments, the management system 103 can include a plurality of devices installed in racks which can make up a server bank, aggregate computing system, or a computer bank in a data center or other like facility. In some examples, the management system 103 can include high-availability computing systems. A high-availability computing system is a group of computing devices that act as a single system to provide a continuous and constant uptime. The devices in the management system 103 can include any number of physical machines, virtual machines, pods, containers, virtual appliances, and software, such as operating systems, drivers, hypervisors, scripts, and applications.

In some examples, a management system 103 can include a computing environment that includes hundreds or even thousands of physical machines, as well as virtual machines 146 and other software implemented in devices stored in server racks, distributed geographically, and connected to one another through the network 109. It is understood that any virtual machine 146 or other virtual appliance can be implemented using at least one physical device, such as a server or other computing device.

The management system 103 can utilize various hosts 106 to enable the operation of workloads including applications and services provided using the virtual machines 146. The hosts 106 can include physical computing hardware including, servers, datastores, memories, and other storage devices, switches, routers, and other network devices, graphics cards having one or more GPUs, central processing units (CPUs), power supplies, and other devices. In various examples, the servers can include requisite physical hardware and software to create and manage virtualization infrastructure or a cloud computing environment. In some examples, the computing resources can also include virtual computing resources, such as virtual machines 146 or other software.

The management service 120 can monitor usage data for the hosts 106. In some cases, the hosts 106 can include instructions to transmit this usage data to the management service 120. The usage data can include actual usage values and metrics for compute, memory, graphics, temporary storage, persistent storage, and other resources. Errors and other metrics can also be provided in the usage data. The usage data can be included in the host records 131.

The datastore 110 can include memory of the management system 103, mass storage resources of the management system 103, or any other storage resources on which data can be stored by the management system 103. The datastore 110 can include memory and datastores for the hosts 106. For instance, the datastore 110 can include one or more relational databases, such as structure query language (SQL) databases, non-SQL databases, or other relational or non-relational databases. The data stored in the datastore 110, for example, can be associated with the operation of the various services or functional entities described below. The datastore 110 can include a database or other memory that includes, for example, a scheduler 123, host records 131, virtual machine records 132, and GPU-remoting latencies 133.

The scheduler 123 can oversee the deployment of workloads that utilize hosts 106. For example, the scheduler 123 can create, organize, prioritize, distribute, balance, and destroy virtual machines 146 and other workloads that are assigned to utilize the hosts 106. The scheduler 123 can include vSphere® Dynamic Resource Scheduler (DRS), or another virtual machine deployment platform. The scheduler 123 can utilize resource providers that are referred to as hosts 106. Each host can refer to a particular set of hosts 106. In some cases, each node can execute a virtual machine agent or virtual machine deployment platform instructions associated with a virtual machine deployment platform. The virtual machine agent can enable the scheduler 123 to deploy virtual machines to the hosts 106 of the host. The virtual machine agent can include a vSphere® ESXi executable.

Resource isolation or tenancy between enterprises, user groups, and users can be provided using resource pools. For example, each host 106 can be exclusively assigned to a single resource pool at a time. Affinity rules such as affinities and anti-affinities can be provided using virtual machine groups and host groups. For example, a virtual machine 146 can have an affinity or anti-affinity with a host or another virtual machine 146. Resource requirements can be defined using a number of vCPUs, memory resources, as well as reservations, limits, and shares for vCPU and memory allocations.

A host record 131 can represent information related to a host 106 used as a host for a workload such as an application, service, microservice, or virtual machine 146. The host record 131 can include information such as the amount of memory installed on the host 106, the number and type of processors installed on the host 106, the number and type of GPUs installed on the host 106, the number and type of network connections installed on the host 106, and various other data. The host record 131 can also include information related to the virtual machines 146 currently hosted on the host 106. For example, the host record 131 can include a record of the number of virtual machines 146 hosted on one or more hosts 106. As another example, the host record 131 can include a record of the amount and type of computer resources currently allocated to each of the virtual machines 146 deployed to the host. These records can include the number of processor cores, amount of memory, amount of storage, number of GPUs, and the number of network connections. Likewise, the host record 131 can include the amount of allocated computer resources consumed by each of the virtual machines 146. For example, the host record 131 can include an indication that one virtual machine 146 is consuming 75% of the memory allocated to it and is using 47% of the processor resources allocated to it, while another virtual machine 146 is consuming 15% of the memory allocated to it and is using 97% of the processor resources allocated to it. GPU-remoting latencies 133 can also be stored in the host records 131. For example, a host record 131 for a particular host 106 can indicate respective GPU-remoting latencies 133 from the host 106 to a number of GPU-remoting server virtual machines 147 on other hosts 106.

A virtual machine record 132 can represent information related to a virtual machine 146 executing as a guest by a host 106 of one or more hosts managed by the scheduler 123. For example, this information can include an identifier such as a universally unique identifier (UUID) or name for the virtual machine 146, a version and type of operating system installed on the virtual machine 146. A virtual machine record 132 can also include the number and type of applications installed on the virtual machine 146. In some implementations, the virtual machine record 132 can also include a record of the amount and type of computer resources currently allocated to the virtual machine 146. For example, the virtual machine record 132 can include the number of processor cores, amount of memory, amount of storage, number of GPUs, and the number of network connections assigned to the virtual machine 146. Likewise, the virtual machine record 132 can include the amount of allocated computer resources currently consumed by the virtual machine 146. For example, the virtual machine record 132 can include an indication that the virtual machine 146 is consuming 75% of the memory allocated to it and is using 47% of the processor resources allocated to it. In some implementations, this information may be recorded in the virtual machine record 132 on a historical basis, for example hourly, daily, monthly, and so on.

GPU-remoting latencies 133 can also be stored in the virtual machine records 132. For example, a virtual machine record 132 for a GPU-remoting server virtual machine 147 can indicate respective GPU-remoting latencies 133 from the GPU-remoting server virtual machine 147 to a number of hosts 106 in the cluster or otherwise in the networked environment 100. A virtual machine record 132 for a GPU-remoting client virtual machine 148 can indicate respective GPU-remoting latencies 133 from the GPU-remoting client virtual machine 148 to a number of GPU-remoting server virtual machines 147 in the cluster or otherwise in the networked environment 100.

The components executed on the management system 103 can include, for example, a management service 120 as well as other applications, services, processes, systems, engines, or functionality not discussed in detail herein. The management service 120 can be executed to oversee the operation of the networked environment 100 through management of the hosts 106 as well as the physical and virtual computing resources that make up the hosts 106. In some examples, an enterprise, organization, or other entity can operate the management service 120 to oversee or manage the operation of devices in racks, such as servers, switches, datastores, CPUs, GPUs, power supplies, cooling systems, and other components. The scheduler 123 can be a component or module of the management service 120, or separate machine-readable instructions.

The GPU-remoting latencies 133 can include a round trip latency for a GPU workload 154 of a GPU-remoting client virtual machine 148 to access a remoting-enabled GPU device 149, for example, through a GPU-remoting service 151 of a GPU-remoting server virtual machine 147. In other words, the GPU-remoting latencies 133 can include latencies between hosts 106 that include a GPU-remoting client virtual machine 148 and hosts 106 that include GPU-remoting server virtual machines 147.

Each of the hosts 106 can include virtual machines 146 that implement workloads such as services, microservices, applications, and distributed applications. The virtual machines 146 can include GPU-remoting server virtual machines 147 and GPU-remoting client virtual machines 148. The GPU-remoting server virtual machines 147 can include a GPU-remoting service 151. The GPU-remoting client virtual machines 148 can include a GPU workload 154.

The GPU-remoting service 151 can provide access to a remoting-enabled GPU device 149 to perform the GPU workload 154. The GPU-remoting service 151 can be part of a vSphere® ESXi executable. The virtual machines 146 can include GPU-remoting server virtual machines 147 that include one or more GPU workloads 154. The GPU-remoting server virtual machine 147 can include instructions that interact with the GPU-remoting service 151 to enable access to a remoting-enabled GPU device 149 to perform the GPU workload 154. In some cases, these instructions can be included as a module or component of the GPU workload 154. The GPU workload 154 can include machine learning workloads, deep learning workloads, and graphics processing workloads that are capable of being performed using a GPU such as a remoting-enabled GPU device 149. The instructions that interact with the GPU-remoting service 151 can be part of a vSphere® ESXi executable.

The GPU-remoting service 151 can enable one or more GPU-remoting client virtual machines 148 to concurrently share a single GPU resource such as the remoting enabled GPU device 149. Each of the GPU-remoting client virtual machines 148 can include high performance GPU workloads 154 that can use a GPU computing framework such as compute unified device architecture (CUDA) to offload computation to remoting enabled GPU devices 149. The GPU-remoting service 151 can utilize an API execution model in which a GPU-remoting server virtual machine is used to manage remoting enabled GPU devices 149 through the hypervisor. The GPU-remoting server virtual machine 147 can provide GPU-remoting services 151 to multiple GPU-remoting client virtual machines 148. Applications running on GPU-remoting client virtual machines 148 can access remoting enabled GPU devices 149 to accelerate their GPU workloads 154.

The access process can include a GPU-remoting client virtual machine 148 identifying, for a GPU workload 154, a set of one or more CUDA API calls, along with corresponding parameters. The GPU-remoting client virtual machine 148 can transfer the API calls and parameters to the GPU-remoting server virtual machine 147. The GPU-remoting service 151 of the GPU-remoting server virtual machine 147 can execute the CUDA API calls using the remoting-enabled GPU device 149, collect the results, and transfer the results back to the GPU-remoting client virtual machine 148. The GPU-remoting client virtual machine 148 receives the results of the CUDA (or other GPU-remoting) API calls and provides them to the GPU workloads 154. This API execution model is capable of being implemented remotely, where the GPU-remoting server virtual machine 147 is implemented on a separate host 106 from the GPU-remoting client virtual machine 148, and each of the transfers includes transmission across the network 109. However, the API execution model can also be implemented locally, where the GPU-remoting server virtual machine 147 is implemented on the same host 106 as the GPU-remoting client virtual machine 148 and the transfer of information is implemented using a local bus of the host 106 and local transfer operations.

GPU-remoting architectures can be affected by the GPU-remoting latency 133 or network latency between the GPU-remoting server virtual machine 147 and the GPU-remoting client virtual machine 148. The resource scheduler 123 can consider GPU-remoting latency 133, along with host memory and compute capability and utilization for placement, resource balancing, and migration. For example, the GPU-remoting latency 133 can be minimized by locating both on a single host 106. However, where memory or compute resource contention is possible, the resource scheduler 123 can instead migrate the GPU-remoting client virtual machine 148 to a separate host 106 that minimizes the GPU-remoting latency 133 between the GPU-remoting server virtual machine 147 and the GPU-remoting client virtual machine 148.

The GPU-remoting server virtual machine 147 can enable GPU virtualization for the GPU workload 154 by GPU-remoting API calls to and from the GPU-remoting client virtual machine 148. One set of GPU-remoting API calls can include Nvidia® CUDA and other GPU-remoting architectures, implemented using remoting-enabled GPU devices 149. GPU-remoting architectures can efficiently support both graphics and non-graphics operations. The GPU-remoting architecture software stack can include a hardware driver, an application programming interface (API) and its runtime library. GPU-remoting applications can use the GPU-remoting APIs to access the remoting-enabled GPU devices 149 at runtime to get device information, copy data, and shift the computing workload to remoting-enabled GPU devices 149. The programming and execution model of GPU workloads 154 can involve copying input data from the main memory of the host 106 to the GPU memory of the remoting-enabled GPU device 149 and launching kernel to be executed on a remoting-enabled GPU device 149, where each kernel includes a computational unit for a specific task. The remoting-enabled GPU device 149 can execute the kernel and copy output data back from the GPU memory of the remoting-enabled GPU device 149 to the main memory of the host 106.

This GPU-remoting architecture does not require virtual machines 146 that use GPUs to co-locate on a same physical host 106 with the GPU, unlike other GPU virtualization solutions. In other words, the GPU-remoting components discussed herein can be considered GPU virtualization components that are capable of remoting or providing remote access to GPU resources including the remoting-enabled GPU devices 149. However, the GPU-remoting architecture can also provide local access between GPU-remoting server virtual machines 147 and the GPU-remoting client virtual machines 148 co-located on the same host 106.

Figure 2:
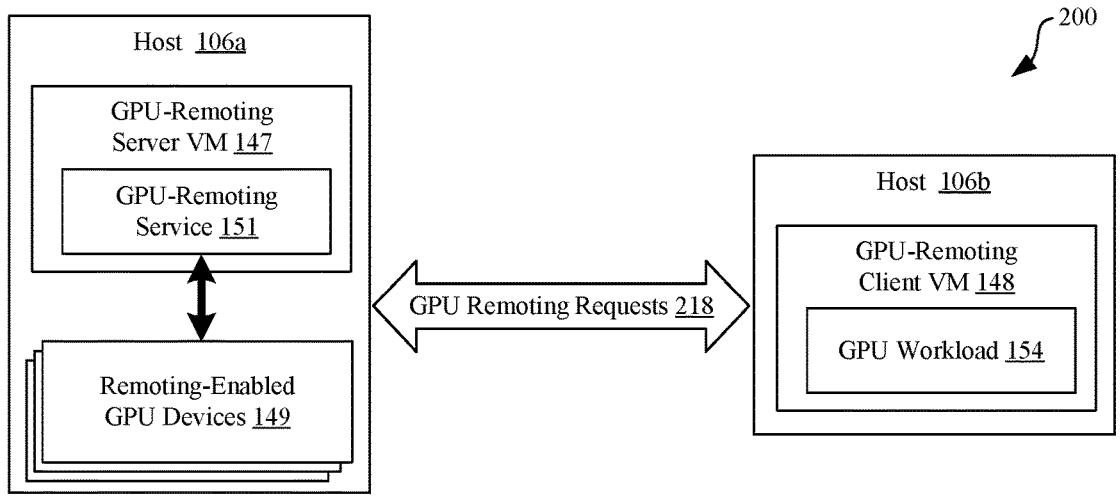
FIG. 2 is a drawing illustrating an example of functionalities implemented by components of the networked computing environment of FIG. 1.

FIG. 2 shows functionalities implemented by components of the networked environment 100 of FIG. 1. The components of the networked environment 100 can be considered components of a GPU-remoting architecture 200. The GPU-remoting architecture 200 can include a host 106a and a host 106b. The host 106a can execute a GPU-remoting server virtual machine 147 that includes a GPU-remoting service 151. The host 106a can also include the remoting-enabled GPU devices 149. Generally, GPU-remoting services 151 can be located on hosts 106 that have remoting-enabled GPU devices 149. As a result, the GPU-remoting services 151 can have local access to the remoting-enabled GPU devices 149. The host 106b can execute a GPU-remoting client virtual machine 148 that includes a GPU workload 154. GPU-remoting requests 218 between the GPU-remoting server virtual machine 147 and the GPU-remoting client virtual machine 148 can enable the GPU workload 154 to be executed using the remoting-enabled GPU devices 149.

For example, the GPU-remoting client virtual machine 148 can identify a set of one or more CUDA API calls to implement a GPU workload 154. The GPU-remoting client virtual machine 148 can also identify a set of parameters for each of the API calls. The GPU-remoting client virtual machine 148 can transmit a GPU-remoting request 218 to the GPU-remoting server virtual machine 147 on the host 106a. The GPU-remoting request 218 can include the API calls and corresponding parameters. The GPU-remoting service 151 of the GPU-remoting server virtual machine 147 can execute the CUDA API calls based on the GPU-remoting request 218 using the remoting-enabled GPU devices 149, collect the results, and transmit the results back to the GPU-remoting client virtual machine 148 on the host 106b.

Figure 3:
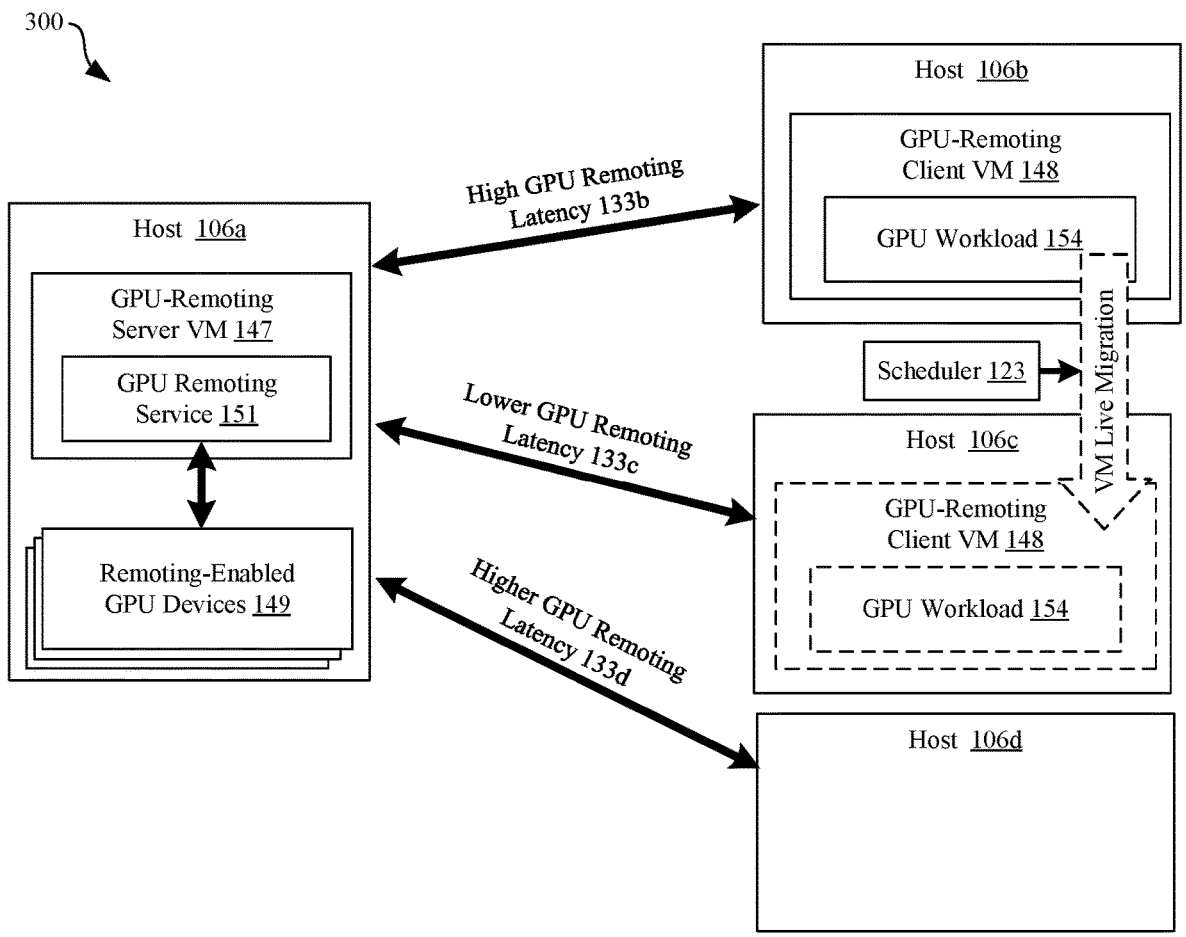
FIG. 3 is a drawing illustrating an example of additional functionalities implemented by components of the networked computing environment of FIG. 1.

FIG. 3 shows additional functionalities implemented by components of the networked environment 100 of FIG. 1. The components of the networked environment 100 can be considered components of a GPU-remoting architecture 300. The GPU-remoting architecture 300 can include hosts 106a, 106b, 106c, and 106d. The host 106a can execute a GPU-remoting server virtual machine 147 that includes a GPU-remoting service 151. The host 106a can also include the remoting-enabled GPU devices 149. The host 106b can execute a GPU-remoting client virtual machine 148 that includes a GPU workload 154. The host 106b can have a high GPU-remoting latency 133 to the GPU-remoting server virtual machine 147. In other words, the host 106b can have a GPU-remoting latency 133 that exceeds or is greater than a threshold latency value.

The scheduler 123 can monitor the hosts 106 and measure or identify respective GPU-remoting latencies 133 for each of the hosts 106. In other words, the scheduler 123 can measure a respective GPU-remoting latency 133 of the host 106b, 106c, and 106d to the GPU-remoting server virtual machine 147. The scheduler 123 can determine that the GPU-remoting latency 133b of the host 106b to the GPU-remoting server virtual machine 147 is greater than the threshold latency value for migration. The scheduler 123 can identify a set of hosts 106 or migration candidate hosts that include sufficient resource capacity to execute the GPU-remoting client virtual machine 148 and the GPU workload 154. The set of hosts 106 can include the hosts 106c and 106d. The scheduler 123 can also determine that the GPU-remoting latency 133c of the host 106c to the GPU-remoting server virtual machine 147 is lower than the GPU-remoting latency 133b, and lower than the threshold latency value for migration. The scheduler 123 can further determine that the GPU-remoting latency 133d of the host 106d to the GPU-remoting server virtual machine 147 is higher than the GPU-remoting latency 133b. These and other factors can be used to select the host 106c as a destination host for the GPU-remoting client virtual machine 148.

The scheduler 123 can perform a migration of the GPU-remoting client virtual machine 148 and the GPU workload 154 from the host 106b to the host 106c because the GPU-remoting latency 133c of the host 106c to the GPU-remoting server virtual machine 147 is lowest among the hosts 106b, 106c, and 106d. The scheduler 123 can also ensure that the host 106c includes sufficient resource capacity, including sufficient available compute and memory capacities, to execute the GPU-remoting client virtual machine 148 and the GPU workload 154.

While the host 106a can have zero GPU-remoting latency, in some cases it is non-optimal or unpermitted to migrate the GPU-remoting client virtual machine 148 to the host 106a that includes the GPU-remoting server virtual machine 147 and the remoting-enabled GPU devices 149. For example, if the host 106a is operating over a threshold host resource utilization for GPU-remoting hosts, the scheduler 123 can disable migrations or otherwise decline to migrate the GPU-remoting client virtual machine 148 to the host 106a. The host 106a can be referred to as a GPU-remoting host because it includes the GPU-remoting server virtual machine 147 and the remoting-enabled GPU devices 149.

Figure 4:
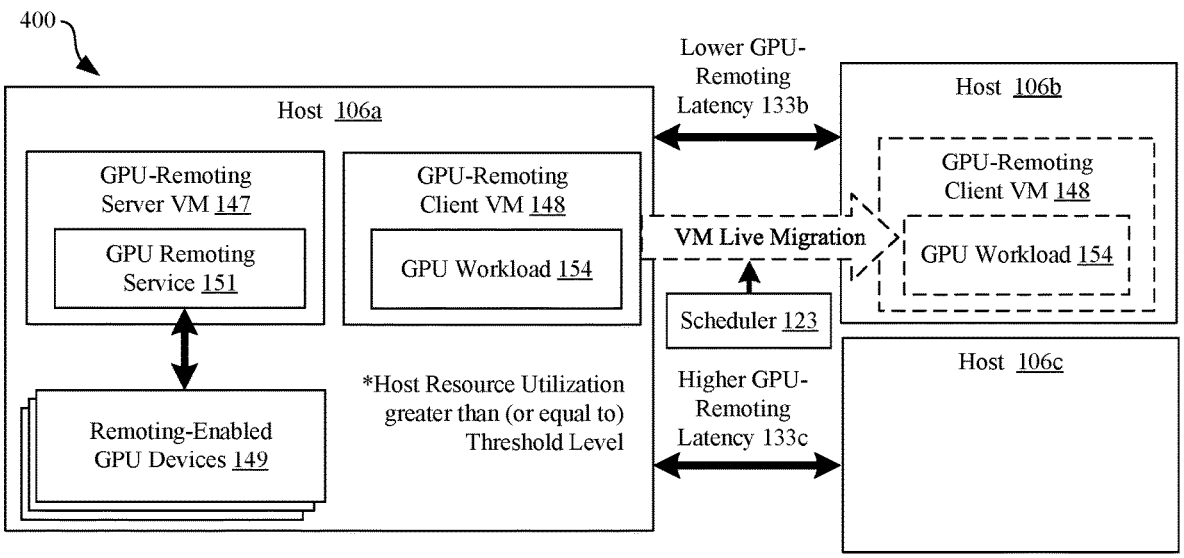
FIG. 4 is a drawing illustrating an example of additional functionalities implemented by components of the networked computing environment of FIG. 1.

FIG. 4 shows additional functionalities implemented by components of the networked environment 100 of FIG. 1. The components of the networked environment 100 can be considered components of a GPU-remoting architecture 400. The GPU-remoting architecture 400 can include hosts 106a, 106b, and 106c. The host 106a can execute a GPU-remoting server virtual machine 147 that includes a GPU-remoting service 151. The host 106a can also include the remoting-enabled GPU devices 149. In this example, the host 106a can also execute a GPU-remoting client virtual machine 148 that includes a GPU workload 154.

The scheduler 123 can determine that the host 106a is operating over a threshold host resource utilization for GPU-remoting hosts. This can cause resource contention on the host 106a and can slow all local and remote access to the remoting-enabled GPU devices 149. As a result, the scheduler 123 can migrate one or more virtual machines away from the host 106a in order to increase available host resources. In some cases, the scheduler 123 can migrate non-GPU-remoting virtual machines 146 away from the host 106a to a host 106 that does not include remoting-enabled GPU devices 149. However, if no non-GPU-remoting virtual machines 146 are found, or the actual host resource utilization remains over the GPU-remoting host utilization threshold, the scheduler 123 can migrate the GPU-remoting client virtual machine 148 to another host 106.

Figure 5:
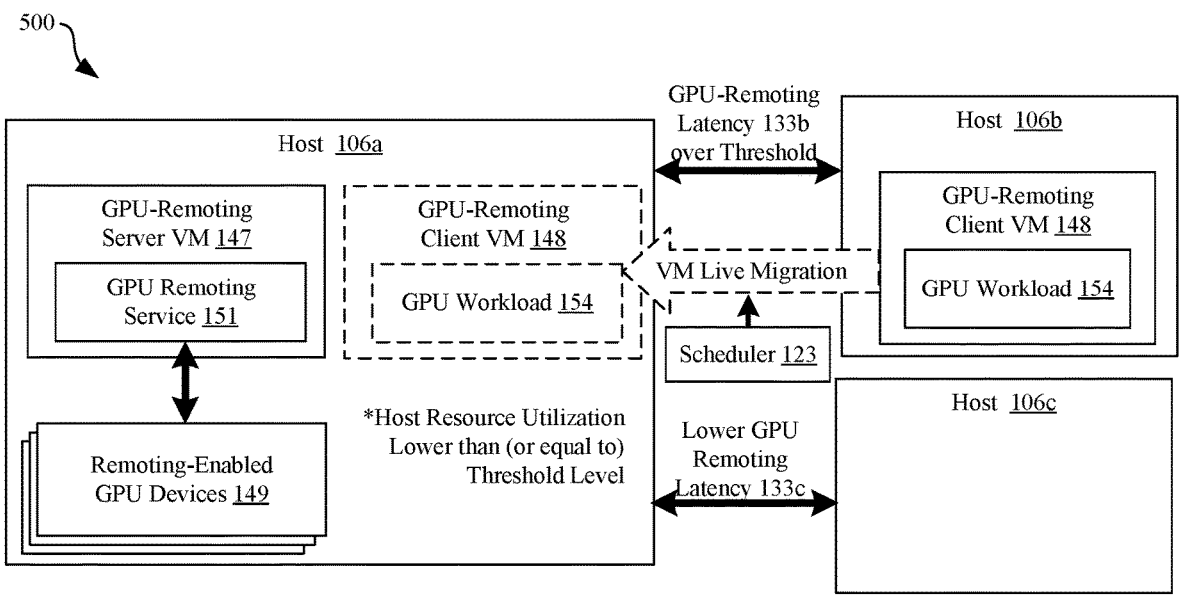
FIG. 5 is a drawing illustrating an example of additional functionalities implemented by components of the networked computing environment of FIG. 1.

In order to accomplish this migration, the scheduler 123 can identify a set of hosts 106 or migration candidate hosts that include sufficient resource capacity to execute the GPU-remoting client virtual machine 148 and the GPU workload 154. The set of hosts 106 can include the hosts 106b and 106c. The scheduler 123 can identify a GPU-remoting latency 133b of the host 106b to the GPU-remoting server virtual machine 147, as well as a GPU-remoting latency 133c of the host 106c to the GPU-remoting server virtual machine 147. The scheduler 123 can determine that the GPU-remoting latency 133b of the host 106b is lower than the GPU-remoting latency 133b of the host 106c. The scheduler 123 can select the host 106b as a destination host for the GPU-remoting client virtual machine 148 because the GPU-remoting latency 133b is the lowest among the set of hosts 106 that include sufficient resource capacity to execute the GPU-remoting client virtual machine 148 and the GPU workload 154. The scheduler 123 can migrate the GPU-remoting client virtual machine 148 and the GPU workload 154 to the host 106b FIG. 5 shows additional functionalities implemented by components of the networked environment 100 of FIG. 1. The components of the networked environment 100 can be considered components of a GPU-remoting architecture 500. The GPU-remoting architecture 500 can include hosts 106a, 106b, and 106c. The host 106a can execute a GPU-remoting server virtual machine 147 that includes a GPU-remoting service 151. The host 106a can also include the remoting-enabled GPU devices 149. The host 106b can execute a GPU-remoting client virtual machine 148 that includes a GPU workload 154.

The scheduler 123 can determine that the GPU-remoting latency 133b of the host 106b to the GPU-remoting server virtual machine 147 is greater than a threshold latency value for migration. The scheduler 123 can determine that the host 106a, which includes the GPU-remoting server virtual machine 147, is available for migration. In other words, the scheduler 123 can determine that utilized host resources of the host 106a will not exceed a GPU-remoting host resource contention threshold even if the GPU-remoting client virtual machine 148 is migrated to the host 106a. The scheduler 123 can then initiate and perform the migration. Even if the host 106c has a lower GPU remoting latency 133c than that of the host 106b, the scheduler 123 can migrate the GPU-remoting client virtual machine 148 to the host 106a when it is available for migration. The host 106a is favored because the GPU-remoting server virtual machine 147 is located on the host 106a, so there is no network latency.

Figure 6:
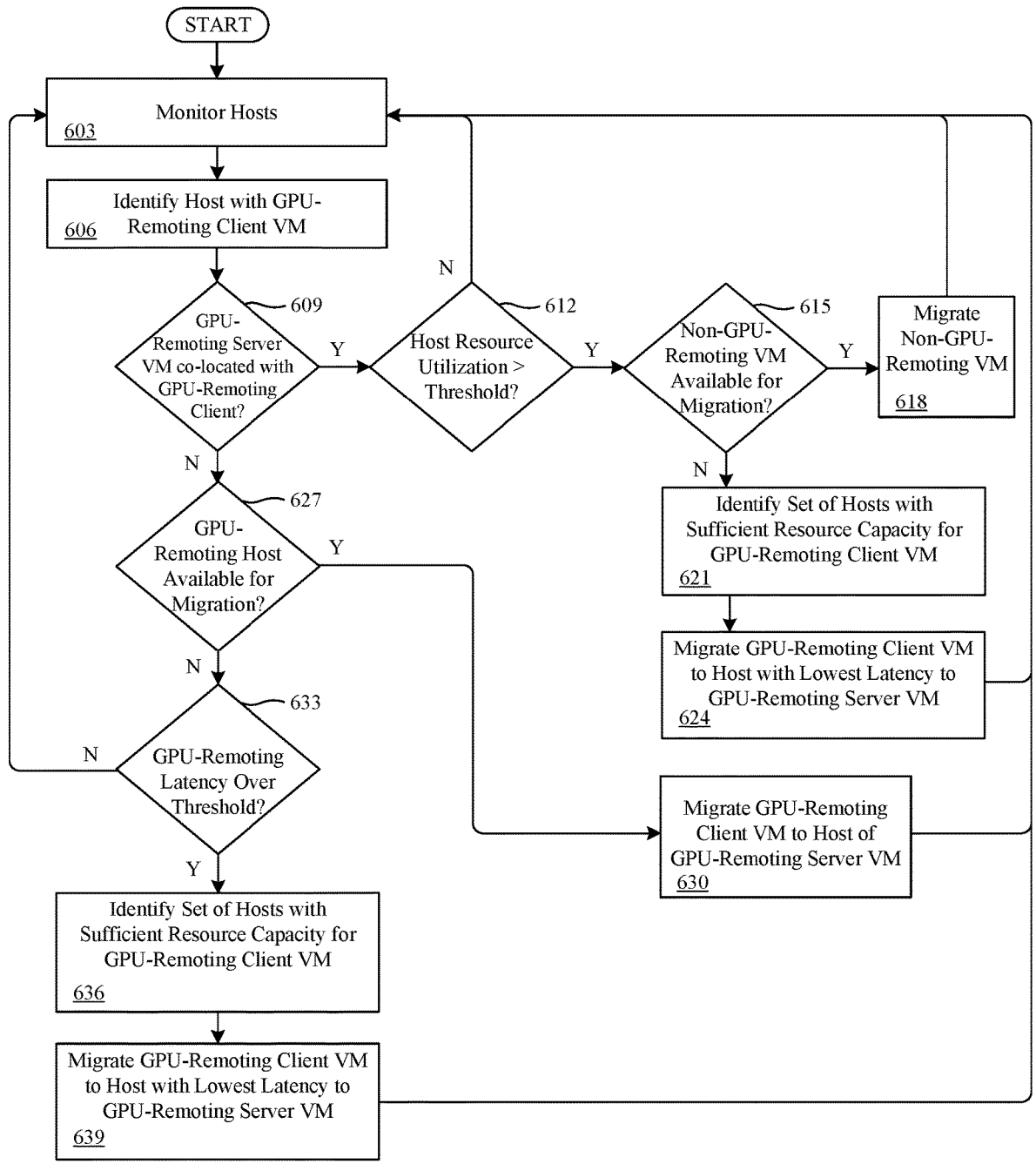
FIG. 6 is a flowchart illustrating functionalities implemented by components of the networked computing environment of FIG. 1.

FIG. 6 is a flowchart illustrating functionalities implemented by components of the networked computing environment 100 of FIG. 1. The flowchart can be viewed as depicting one example of the operation of the scheduler 123 in concert with the other components of the networked environment 100. Generally, the flowchart shows how the scheduler 123 performs GPU-remoting latency aware virtual machine migration.

In step 603, the scheduler 123 can monitor the hosts 106. For example, the scheduler 123 can monitor usage data for the hosts 106. In some cases, the hosts 106 can include instructions to transmit this usage data to the management service 120. The usage data can include actual usage values and metrics for compute, memory, graphics, temporary storage, persistent storage, GPU-remoting latencies 133, and other resources. The scheduler 123 can identify host records 131, virtual machine records 132, and GPU-remoting latencies 133.

In step 606, the scheduler 123 can identify a host 106 that includes a GPU-remoting client virtual machine 148. The GPU-remoting client virtual machine 148 can include a GPU workload 154. The scheduler 123 can analyze the host records 131, virtual machine records 132, and GPU-remoting latencies 133 that are related to the host 106 and the GPU-remoting client virtual machine 148. The scheduler 123 can identify a GPU-remoting latency 133 between the host 106 that includes the GPU-remoting client virtual machine 148, and the GPU-remoting server virtual machine 147 to which it is currently assigned. If the GPU-remoting client virtual machine 148 and the GPU-remoting server virtual machine 147 are co-located on the same host 106, the GPU-remoting latency 133 can be zero. The scheduler 123 can also identify GPU-remoting latencies 133 between the host 106 that includes the GPU-remoting client virtual machine 148, and one or more GPU-remoting hosts 106 that include a GPU-remoting server virtual machine 147. The scheduler 123 can make migration and resource balancing decisions based on this and other information associated with the host records 131, virtual machine records 132, and GPU-remoting latencies 133.

In step 609, the scheduler 123 can determine whether the GPU-remoting server virtual machine 147 is co-located with the GPU-remoting client virtual machine 148. If the GPU-remoting server virtual machine 147 is co-located on the same host 106 with the GPU-remoting client virtual machine 148, then the scheduler 123 can move to step 612. Otherwise, if the GPU-remoting server virtual machine 147 is hosted on a separate host 106 from the GPU-remoting client virtual machine 148, then the scheduler 123 can move to step 627.

In step 612, the scheduler 123 can determine whether the host resource utilization of the host 106 is greater than a threshold for GPU-remoting hosts 106. Because the GPU-remoting server virtual machine 147 is co-located on the same host 106 with the GPU-remoting client virtual machine 148, the GPU-remoting latency 133 can be zero. However, if the host resource utilization is too high, then resource contention can cause inefficiencies for all GPU-remoting client virtual machines 148 that access GPU resources. If the host resource utilization of the host 106 is greater than a threshold for GPU-remoting hosts 106, the scheduler 123 can move to step 615. Otherwise, if the host resource utilization of the host 106 is under the threshold for GPU-remoting hosts 106, the GPU-remoting client virtual machine 148 can remain on the current host 106, co-located with the GPU-remoting server virtual machine 147.

In step 615, the scheduler 123 can determine whether a non-GPU-remoting virtual machine 146 is available for migration. For example, the scheduler 123 can identify a migratable virtual machine 146 that does not include a GPU workload 154 and does not include an affinity rule to the current host 106 or another virtual machine 146 on the current host 106. If a non-GPU-remoting virtual machine 146 is available for migration, the scheduler 123 can proceed to step 618. Otherwise, if a migratable non-GPU-remoting virtual machine 146 is not identified, then the scheduler 123 can proceed to step 621.

In step 618, the scheduler 123 can migrate the non-GPU-remoting virtual machine 146 to another host 106. The scheduler 123 can identify a destination host 106 that includes sufficient resource capacity to execute the non-GPU-remoting virtual machine 146. Thereafter, the scheduler 123 can continue to monitor hosts as described in step 603.

In step 621, the scheduler 123 can identify a set of hosts 106 that have sufficient resource capacity for the GPU-remoting client virtual machine 148. The set of hosts 106 can be referred to as migration candidate hosts 106. The scheduler 123 can identify the set of hosts 106 by comparing resource requirements of the GPU-remoting client virtual machine 148 to the available resources of each of the hosts 106.

In step 624, the scheduler 123 can migrate the GPU-remoting client virtual machine 148 to a particular host 106 that has a lowest GPU-remoting latency 133 to the GPU-remoting server virtual machine 147. The scheduler 123 can compare the GPU-remoting latencies 133 of the set of hosts 106 and select the host 106 having the lowest GPU-remoting latency 133 among the set of hosts 106. The scheduler 123 can migrate the GPU-remoting client virtual machine 148 to the selected destination host 106. The GPU-remoting client virtual machine 148 can access the remoting-enabled GPU devices 149 using GPU-remoting API calls transmitted over a network, for example, in a GPU remoting request 218 as discussed in FIG. 2.

In step 633, the scheduler 123 can determine whether the GPU-remoting latency 133 of the GPU-remoting client virtual machine 148, or its current host 106, is over a threshold latency. If the scheduler 123 determines that the GPU-remoting latency 133 to the GPU-remoting server virtual machine 147 is greater than the threshold latency value for migration, then the process can proceed to step 636. Otherwise, the scheduler 123 can maintain execution of the GPU-remoting client virtual machine 148 on its current host 106 and continue to monitor the hosts 106 as described in step 603.

In step 627, the scheduler 123 can determine whether a GPU-remoting host 106 is available for migration. The GPU-remoting host 106 can be a host 106 that includes a GPU-remoting server virtual machine 147. The scheduler 123 can compare resource requirements of the GPU-remoting client virtual machine 148 to the available resources of the GPU-remoting hosts 106. The scheduler 123 can identify that a GPU-remoting host 106 is available for migration if its utilized host resources of the GPU-remoting host 106 will not exceed a threshold GPU-remoting host resource utilization, even if the GPU-remoting client virtual machine 148 is migrated to the GPU-remoting host 106. If a GPU-remoting host 106 is available for migration, the scheduler 123 select it as the destination host 106, and can proceed to step 630. This will minimize the GPU-remoting latency 133, which can be zero for the GPU-remoting host 106.

In step 630, the scheduler 123 can migrate the GPU-remoting client virtual machine 148 to the host of the GPU-remoting server virtual machine 147, which can be referred to as the GPU-remoting host 106. As a result of the migration to the GPU-remoting host 106, the GPU-remoting client virtual machine 148 can have access to the remoting-enabled GPU device 149 without being affected by network latency. The scheduler 123 can continue to monitor the hosts 106 as described in step 603.

In step 636, the scheduler 123 can identify a set of hosts 106 that have sufficient resource capacity for the GPU-remoting client virtual machine 148. The set of hosts 106 can be referred to as migration candidate hosts 106. The scheduler 123 can identify the set of hosts 106 by comparing resource requirements of the GPU-remoting client virtual machine 148 to the available resources of each of the hosts 106.

In step 639, the scheduler 123 can migrate the GPU-remoting client virtual machine 148 to a particular host 106 that has a lowest GPU-remoting latency 133 to the GPU-remoting server virtual machine 147. The scheduler 123 can compare the GPU-remoting latencies of the 133 set of hosts 106 and select the host 106 having the lowest GPU-remoting latency 133 among the set of hosts 106. The scheduler 123 can migrate the GPU-remoting client virtual machine 148 to the selected destination host 106. The GPU-remoting client virtual machine 148 can access the remoting-enabled GPU devices 149 using GPU-remoting API calls transmitted over a network, for example, in a GPU remoting requests 218 as discussed in FIG. 2.

Stored in the memory device are both data and several components that are executable by the processor. Also stored in the memory can be a datastore 110 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with various aspects of the management service 120. These client devices 108 can include a display upon which a user interface can be rendered. In some examples, the user interface can be generated using user interface data provided by the management system 103. The client device 108 can also include one or more input/output devices that can include, for example, a capacitive touchscreen or other type of touch input device, fingerprint reader, or keyboard.

Although the management service 120 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system comprising:
   at least one computing device comprising at least one processor;
   at least one memory comprising executable instructions, wherein the instructions, when executed by the at least one processor, cause the at least one computing device to at least:
   monitor resources of a plurality of hosts of a datacenter cluster;
   identify a host executing a plurality of virtual machines (VM) including a plurality of non-GPU-workload-based virtual machines and a graphics processing unit (GPU)-remoting client virtual machine (VM), the GPU-remoting client VM comprising a GPU workload;
   determine that the GPU-remoting client VM is to be migrated in response to an identification that: the GPU-remoting client VM is currently co-located with a GPU remoting server VM, resource utilization of the host is greater than a threshold utilization, and the host lacks migratable non-GPU-remoting virtual machines, wherein the host is identified to lack migratable non-GPU-remoting virtual machines in an instance in which a respective one of the plurality of non-GPU-workload-based virtual machines executed by the host comprise at least one affinity rule with the host or a VM executed using the host;
   determine GPU-remoting latencies for at least a subset of the plurality of hosts, a respective GPU-remoting latency corresponding to a host-to-host network latency between: a particular host executing the GPU remoting server VM, and a respective host of the at least the subset of the plurality of hosts, wherein the GPU remoting server VM enables access to a GPU resource using compute unified device architecture call execution;
   identify, based on the monitored resources, a destination host comprising a lower GPU-remoting latency than the host; and
   migrate the GPU-remoting client VM from the host to the destination host based on the destination host comprising the lower GPU-remoting latency than the host.

2. The system of claim 1, wherein the destination host comprises a lowest GPU-remoting latency among the at least the subset of the plurality of hosts.

3. The system of claim 1, wherein the instructions, when executed by the at least one processor, cause the at least one computing device to at least:
   identify the at least the subset of the plurality of hosts based on a respective one of the at least the subset of the plurality of hosts comprising sufficient resources for the GPU-remoting client virtual machine.

4. The system of claim 1, wherein the host is identified to execute the GPU-remoting server virtual machine and the GPU-remoting client virtual machine, and a resource utilization of the host is greater than a threshold utilization.

5. The system of claim 1, wherein the destination host executes the GPU-remoting server virtual machine, and the destination host comprises sufficient resources for the GPU-remoting client virtual machine.

6. The system of claim 1, wherein the GPU-remoting client virtual machine accesses the GPU resource based on GPU-remoting Application Programming Interface (API) calls to the GPU-remoting server virtual machine, wherein the GPU resource is local to the GPU-remoting server virtual machine.

7. The system of claim 6, wherein a respective one of the GPU-remoting API calls comprises data and parameters issued by the GPU workload.

8. A non-transitory computer-readable medium, comprising executable instructions, wherein the instructions, when executed by at least one processor, cause at least one computing device to at least:
   monitor resources of a plurality of hosts of a datacenter cluster;
   identify a host executing a plurality of virtual machines (VM) including a plurality of non-GPU-workloadbased virtual machines and a graphics processing unit (GPU)-remoting client virtual machine (VM), the GPU-remoting client VM comprising a GPU workload;

determine that the GPU-remoting client VM is to be migrated in response to an identification that: the GPU-remoting client VM is currently co-located with a GPU remoting server VM, resource utilization of the host is greater than a threshold utilization, and the host lacks migratable non-GPU-remoting virtual machines, wherein the host is identified to lack migratable non-GPU-remoting virtual machines in an instance in which a respective one of the plurality of non-GPU-workload-based virtual machines executed by the host comprise at least one affinity rule with the host or a VM executed using the host;

determine GPU-remoting latencies for at least a subset of the plurality of hosts, a respective GPU-remoting latency corresponding to a host-to-host network latency between: a particular host executing the GPU remoting server VM, and a respective host of the at least the subset of the plurality of hosts, wherein the GPU remoting server VM enables access to a GPU resource using compute unified device architecture call execution;

identify, based on the monitored resources, a destination host comprising a lower GPU-remoting latency than the host; and migrate the GPU-remoting client VM from the host to the destination host based on the destination host comprising the lower GPU-remoting latency than the host.

9. The non-transitory computer-readable medium of claim 8, wherein the destination host comprises a lowest GPU-remoting latency among the at least the subset of the plurality of hosts.

10. The non-transitory computer-readable medium of claim 9, wherein the instructions, when executed by the at least one processor, cause the at least one computing device to at least:

identify the at least the subset of the plurality of hosts based on a respective one of the at least the subset of the plurality of hosts comprising sufficient resources for the GPU-remoting client virtual machine.

11. The non-transitory computer-readable medium of claim 8, wherein the host is identified to execute the GPU-remoting server virtual machine and the GPU-remoting client virtual machine, and a resource utilization of the host is greater than a threshold utilization.

12. The non-transitory computer-readable medium of claim 8, wherein the destination host executes the GPU-remoting server virtual machine, and the destination host comprises sufficient resources for the GPU-remoting client virtual machine.

13. The non-transitory computer-readable medium of claim 8, wherein the GPU-remoting client virtual machine accesses the GPU resource based on GPU-remoting Application Programming Interface (API) calls to the GPU-remoting server virtual machine, wherein the GPU resource is local to the GPU-remoting server virtual machine.

14. The non-transitory computer-readable medium of claim 13, wherein a respective one of the GPU-remoting API calls comprises data and parameters issued by the GPU workload.

15. A method performed by instructions executed by at least one processor, the method comprising:

monitoring resources of a plurality of hosts of a datacenter cluster;

identifying a host executing a plurality of virtual machines (VM) including a plurality of non-GPU-workload-based virtual machines and a graphics processing unit (GPU)-remoting client virtual machine (VM), the GPU-remoting client VM comprising a GPU workload;

determining that the GPU-remoting client VM is to be migrated in response to an identification that: the GPU-remoting client VM is currently co-located with a GPU remoting server VM, resource utilization of the host is greater than a threshold utilization, and the host lacks migratable non-GPU-remoting virtual machines, wherein the host is identified to lack migratable non-GPU-remoting virtual machines in an instance in which a respective one of the plurality of non-GPU-workload-based virtual machines executed by the host comprise at least one affinity rule with the host or a VM executed using the host;

determining GPU-remoting latencies for at least a subset of the plurality of hosts, a respective GPU-remoting latency corresponding to a host-to-host network latency between: a particular host executing the GPU remoting server VM, and a respective host of the at least the subset of the plurality of hosts, wherein the GPU remoting server VM enables access to a GPU resource using compute unified device architecture call execution;

identifying, based on the monitored resources, a destination host comprising a lower GPU-remoting latency than the host; and migrating the GPU-remoting client VM from the host to the destination host based on the destination host comprising the lower GPU-remoting latency than the host.

16. The method of claim 15, wherein the destination host comprises a lowest GPU-remoting latency among the at least the subset of the plurality of hosts.

17. The method of claim 15, further comprising:

identifying the at least the subset of the plurality of hosts based on a respective one of the at least the subset of the plurality of hosts comprising sufficient resources for the GPU-remoting client virtual machine.

18. The method of claim 15, wherein the host is identified to execute the GPU-remoting server virtual machine and the GPU-remoting client virtual machine, and a resource utilization of the host is greater than a threshold utilization.

19. The method of claim 15, wherein the destination host executes the GPU-remoting server virtual machine, and the destination host comprises sufficient resources for the GPU-remoting client virtual machine.

20. The method of claim 15, wherein the GPU-remoting client virtual machine accesses the GPU resource based on GPU-remoting Application Programming Interface (API) calls to the GPU-remoting server virtual machine, wherein the GPU resource is local to the GPU-remoting server virtual machine.

* * * * *